(12) United States Patent
Becker et al.

(10) Patent No.: US 7,661,024 B2
(45) Date of Patent: Feb. 9, 2010

(54) BUS TERMINATOR/MONITOR/BRIDGE SYSTEMS AND METHODS

(75) Inventors: Karl H. Becker, Riverview, FL (US); David R. Dodgen, Clearwater, FL (US); Mark D. DuBoise, Brandon, FL (US)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 11/932,467

(22) Filed: Oct. 31, 2007

(65) Prior Publication Data

US 2009/0113108 A1 Apr. 30, 2009

(51) Int. Cl.
*G06F 11/07* (2006.01)
*G06F 13/00* (2006.01)

(52) U.S. Cl. .......................... 714/11; 710/306
(58) Field of Classification Search ........................ None
See application file for complete search history.

(56) References Cited

U.S. PATENT DOCUMENTS

| | | | | |
|---|---|---|---|---|
| 4,209,666 A * | 6/1980 | Lawton | ........................ | 370/222 |
| 4,384,327 A * | 5/1983 | Conway et al. | ............... | 710/306 |
| 5,740,386 A * | 4/1998 | Miller et al. | ................. | 710/306 |
| 5,742,851 A * | 4/1998 | Sekine | ......................... | 714/43 |
| 5,903,370 A * | 5/1999 | Johnson | ........................... | 398/4 |
| 6,061,754 A * | 5/2000 | Cepulis et al. | ............... | 710/312 |
| 6,067,596 A * | 5/2000 | Nguyen et al. | ............... | 710/306 |
| 6,112,271 A * | 8/2000 | Lanus et al. | .................. | 710/306 |
| 6,199,179 B1 * | 3/2001 | Kauffman et al. | ............. | 714/26 |
| 6,202,115 B1 * | 3/2001 | Khosrowpour | ............... | 710/312 |
| 6,263,452 B1 * | 7/2001 | Jewett et al. | ..................... | 714/9 |
| 6,618,783 B1 * | 9/2003 | Hammersley | ............... | 710/305 |
| 6,675,250 B1 * | 1/2004 | Ditner et al. | ................. | 710/305 |
| 6,708,283 B1 * | 3/2004 | Nelvin et al. | ................... | 714/5 |
| 6,934,880 B2 * | 8/2005 | Hofner | ......................... | 714/10 |
| 7,200,781 B2 * | 4/2007 | Mantey et al. | ................. | 714/53 |
| 7,310,781 B2 * | 12/2007 | Chen et al. | .................... | 715/769 |
| 7,478,174 B2 * | 1/2009 | Ellerbrock et al. | ........... | 709/251 |
| 7,480,831 B2 * | 1/2009 | McAfee et al. | ................. | 714/43 |
| 2003/0065861 A1 * | 4/2003 | Clark et al. | .................. | 710/305 |
| 2004/0059862 A1 * | 3/2004 | Chan | ........................... | 710/316 |

\* cited by examiner

*Primary Examiner*—Thomas J Cleary
*Assistant Examiner*—Trisha Vu
(74) *Attorney, Agent, or Firm*—Ingrassia Fisher & Lorenz, P.C.

(57) ABSTRACT

Computing systems including first and second processors configured to control first and second buses, respectively, and a terminator-monitor-bridge (TMB) device coupled between the first and second buses are provided. The TMB device is configured to selectively enable the first processor and the second processor to control at least a portion of the second bus and the first bus, respectively. TMB devices and methods for operating the TMB devices in accordance with the above configuration are also provided.

19 Claims, 3 Drawing Sheets

BUS TERMINATOR/MONITOR/BRIDGE SYSTEMS AND METHODS

TECHNICAL FIELD

The present invention generally relates to computing systems, and more particularly relates to smart serial bus terminator/monitor/bridge systems and methods for providing dual-fault tolerance in computing systems.

BACKGROUND

Aerospace vehicles include networked computing systems that have a high level of reliability. As such, aerospace vehicles typically employ a combination of special purpose and general purpose computing systems working together over a network and having redundant computing devices for certain functions. These redundant computing devices typically include a primary computing device and one or more backup computing devices. Such a configuration enables the backup computing device(s) to take over control or become a replacement for essential functions in the unlikely event that the primary computing device experiences a non-function. For example, many aircraft employ more than one computer-based device capable of maintaining/controlling the flight controls, and more than one computer-based device capable of maintaining/controlling the displays on the flight deck.

Contemporary redundant computing systems often need to be customized for the particular vehicle in which they will be used. As computer technology changes, these customized systems may become less efficient than they otherwise could be and/or may become outdated. Furthermore, customization, by its nature, may require a considerable amount of resources to design and maintain customized systems.

Accordingly, it is desirable to provide redundant networked computing systems using a smart serial bus terminator/monitor/bridge device that provides dual-fault tolerance. In addition, it is desirable to use commercial off-the-shelf devices to construct these redundant computing systems. Furthermore, other desirable features and characteristics of the present invention will become apparent from the subsequent detailed description of the invention and the appended claims, taken in conjunction with the accompanying drawings and this background of the invention.

BRIEF SUMMARY

Various exemplary embodiments of the invention provide a redundant computing system. One computing system comprises a first bus, a second bus, a first processor coupled to and configured to control the first bus, a second processor coupled to and configured to control the second bus, and a terminator-monitor-bridge (TMB) device coupled between the first bus and the second bus. The TMB device is configured to selectively enable the first processor and the second processor to control at least a portion of the second bus and the first bus, respectively.

Methods for operating a TMB device coupled between a first bus controlled by a first processor and a second bus controlled by a second processor are also provided. One method comprises the step of monitoring the first bus and the second bus for faults. If a fault is detected on the second bus, the method comprises the step of at least temporarily enabling the first processor to control a portion of the second bus. If a fault is detected on the first bus, the method comprises the step of at least temporarily enabling the second processor to control a portion of the first bus.

Various exemplary embodiments also provide TMB devices configured to be coupled to a first bus controlled by a first processor and a second bus controlled by a second processor. A TMB device comprises means for monitoring the first bus and the second bus for faults. The TMB device also comprises means for at least temporarily enabling the first processor to control a portion of the second bus if a fault is detected on the second bus and means for at least temporarily enabling the second processor to control a portion of the first bus if a fault is detected on the first bus.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
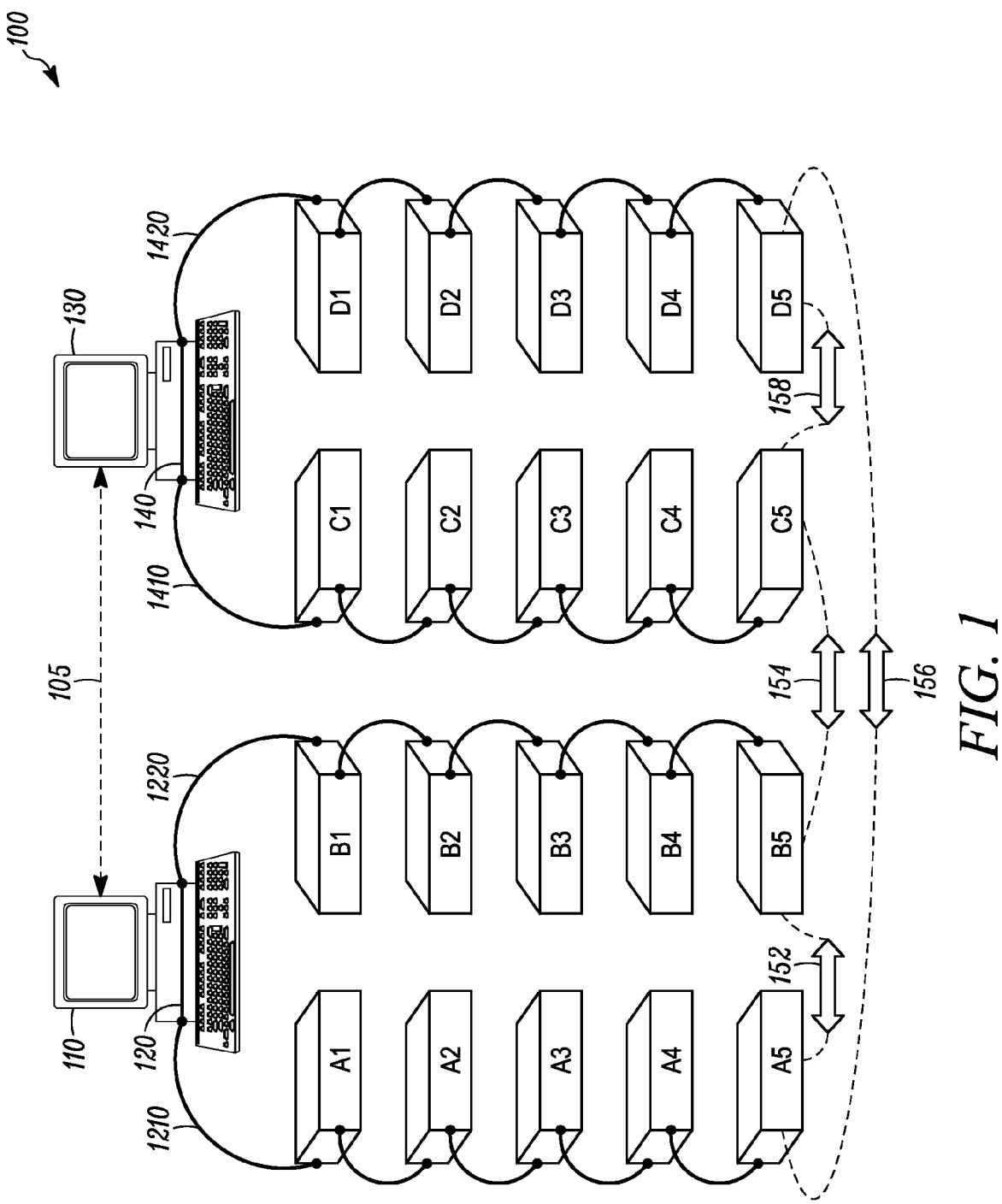
FIG. 1 is a schematic diagram of one exemplary embodiment of a redundant computing system.

FIG. 1 is a schematic diagram of one exemplary embodiment of a redundant computing system 100. As illustrated, system 100 includes a first computing device 110, a second computing device, and one or more terminator/monitor/bridge (TMB) devices 152-158 (collectively TMB devices 150). The first and second computing devices 110, 130 are in operable communication with each other (via a wired and/or wireless network 105), and each of computing devices 110 and 130 includes one or more processors (e.g., processors 120 and 140, respectively).

Processor 120 is in communication with a plurality of hardware components A1-A5 and/or B1-B5 via buses 1210 and 1220. Similarly, processor 140 is in communication with a plurality of hardware components C1-C5 and/or D1-D5 via buses 1410 and 1420. Examples of hardware components A1-A5, B1-B5, C1-C5, and D1-D5 include, but are not limited to, sensors, actuators, data storage devices (e.g., hard drives, memory, disk drives, etc.), data output devices (e.g., printers, video displays, etc.), and the like devices. As such, it will be appreciated that hardware components A1-A5, B1-B5, C1-C5, and D1-D5 may be disposed within computing devices 110 and 130, disposed external to computing devices 110 and 130, or various combinations of each.

Buses 1210, 1220, 1410, and 1420 may be any device, hardware, and/or software capable of transferring data or power between processor 120, processor 140, and hardware components A1-A5, B1-B5, C1-C5, and D1-D5. Examples of buses 1210, 1220, 1410, and 1420 include, but are not limited to, a universal serial bus (USB), an IEEE 1394 bus (Firewire, i.Link, etc.), an RS 422 bus, an Ethernet bus, and the like buses.

TMB devices 150 are in operable communication with buses 1210, 1220, 1410, and 1420 and selectively couple buses 1210, 1220, 1410, and 1420 to one another. TMB devices 150 are compatible with buses 1210, 1220, 1410, and 1420, meaning that TMB devices 150 are recognized by processor 120 and/or 140 as a single remote device on one or more of busses 1210, 1220, 1410, and 1420 and as a device that participates in bus configuration as an information providing device. TMB devices 150 are configured to electrically and/or logically behave in such a manner as to independently stabilize the bus configuration process provided that the bus configuration process occurs within a reasonable time based upon the communications protocol (e.g., USB, IEEE 1394, RS 422, Ethernet, etc.) being used. As such, TMB devices 150 may be any device, hardware, software (including embedded software), and/or firmware suitably configured to perform the functions discussed below.

TMB devices 150 are configured to perform specific and well-defined functions, some of which support, but are otherwise autonomous from the other bus management functions of buses 1210, 1220, 1410, and 1420. Specifically, TMB devices 150 are configured to perform a string terminator function, a bus status monitoring function, a bus health monitoring function, an automated redundancy management function, and/or an intelligent bridge function.

The string terminator function is a function that occurs during initial bus configuration or during recovery from a bus reset. That is, if a bus to which TMB devices 150 are connected initiates a configuration arbitration, TMB devices 150 identify themselves as the last device connected to that particular bus (i.e., the termination point of the bus), or as the device with lowest bus priority. This ensures that the identification and dynamic assignment of node identifications between the bus manager and TMB devices 150 are consistently repeated, and that the bus manager works independently for each bus attached to TMB devices 150.

The bus status monitoring function is a function that supports bus configuration monitoring during normal execution. Specifically, TMB devices 150 are programmed with the expected bus configuration and, in a more dynamic operating mode, TMB devices 150 may also capture and store information about the current bus configuration, which information may be used to detect future changes in the bus configuration. In some embodiments, the bus status monitoring function implements periodic reporting to system level software, which ensures that the status of each bus 1210, 1220, 1410, and 1420 to which a particular TMB device 150 is connected is known at all times, and is communicated to processor 120 and/or 140 via another bus.

Though listed and discussed as a separate function, the bus health monitoring function may also, at least in some embodiments, be included as part of the bus status monitoring function. That is, TMB devices 150 are configured to compare a new bus configuration to both the prior bus configuration and a desired bus configuration, and are also configured to detect a bus configuration change or mismatch that may be indicative of a processor or wiring non-function. In one exemplary embodiment, TMB devices 150 implement an algorithm that, for example, detects and verifies that a proper bus manager (e.g., processor 120 or 140) is managing the resources of buses 1210, 1220, 1410, and 1420. If TMB devices 150 detect that an improper device is managing bus resources, TMB devices 150 are configured to alert system 100 of an intrusion or failure, while also triggering an automated attempt to recover the proper bus manager or automatically reconfiguring the bus in question so that the bus is managed by another designated bus manager.

The automated redundancy management function is implemented in response to a dynamic reconfiguration event on one or more of buses 1210, 1220, 1410, and 1420. Specifically, TMB devices 150 are configured to compare a new bus configuration to both the prior bus configuration and a desired bus configuration, and are also configured to detect a bus configuration change or mismatch that may also be indicative of a processor or wiring non-function on one or more of buses 1210, 1220, 1410, and 1420. TMB devices 150 are configured to determine if one or more of the hardware components (A1-A5, B1-B5, C1-C5, and D1-D5) coupled to buses 1210, 1220, 1410, and 1420 are not properly linked to system 100, and is so, to initiate a recovery of the hardware component(s) by implementing the bus bridge function discussed below. In one embodiment, if the configuration process on one of the buses to which TMB devices 150 are connected exceeds a predetermined allocated time, TMB devices 150 respond, in a pre-programmed manner, to recover the non-functioning bus by reconfiguring themselves as a bridge. That is, TMB devices 150 connect the hardware components (A1-A5, B1-B5, C1-C5, and D1-D5) on the non-functioning bus to a functioning bus to which the TMB devices 150 are connected.

The intelligent bus bridge function is a recovery mode of operation. Specifically, TMB devices 150 are configured to recover accessible portions of a non-functioning bus as either an extension of the bus connected to an opposing port of the TMB device 150, or as a sub-network of the bus on the other port. The intelligent bus bridge function also acts as a backup communication mode by enabling communications between components (e.g., processors 120, 140, and hardware components A1-A5, B1-B5, C1-C5, and D1-D5) on one of the buses via another bus connected to the TMB device 150.

In one exemplary embodiment, TMB devices 154 and 156 have priority over TMB devices 152 and 158. That is, TMB devices 152 and 158 function as described above, but are used to back up TMB devices 154 and 156 if TMB devices 154 and/or 156 experience a non-function. Specifically, TMB devices 156 and 154 are the primary TMB devices responsible for terminating, monitoring, and bridging buses 1210 and 1420 and buses 1220 and 1410, respectively; however, if TMB device 156 non-functions, TMB device 152 performs the terminating, monitoring, and bridging functions for bus 1210 and TMB device 158 performs the terminating, monitoring, and bridging functions for bus 1420. Likewise, if TMB device 154 non-functions, TMB device 152 performs the terminating, monitoring, and bridging functions for bus 1220 and TMB device 158 performs the terminating, monitoring, and bridging functions for bus 1410. Furthermore, if TMB devices 154 and 156 are both non-functioning, TMB device 152 performs the terminating, monitoring, and bridging functions for buses 1210 and 1220, and TMB device 158 performs the terminating, monitoring, and bridging functions for buses 1410 and 1420.

In other embodiments, system 100 does not include one or both of TMB devices 152 and 158. That is, system 100 may include TMB devices 154 and 156, and any combination of TMB devices 152 and 158. Furthermore, processors 120 and 140 may be contained within a single computing device (e.g., computing device 110 or 130) incorporating two or more buses.

Figure 2:
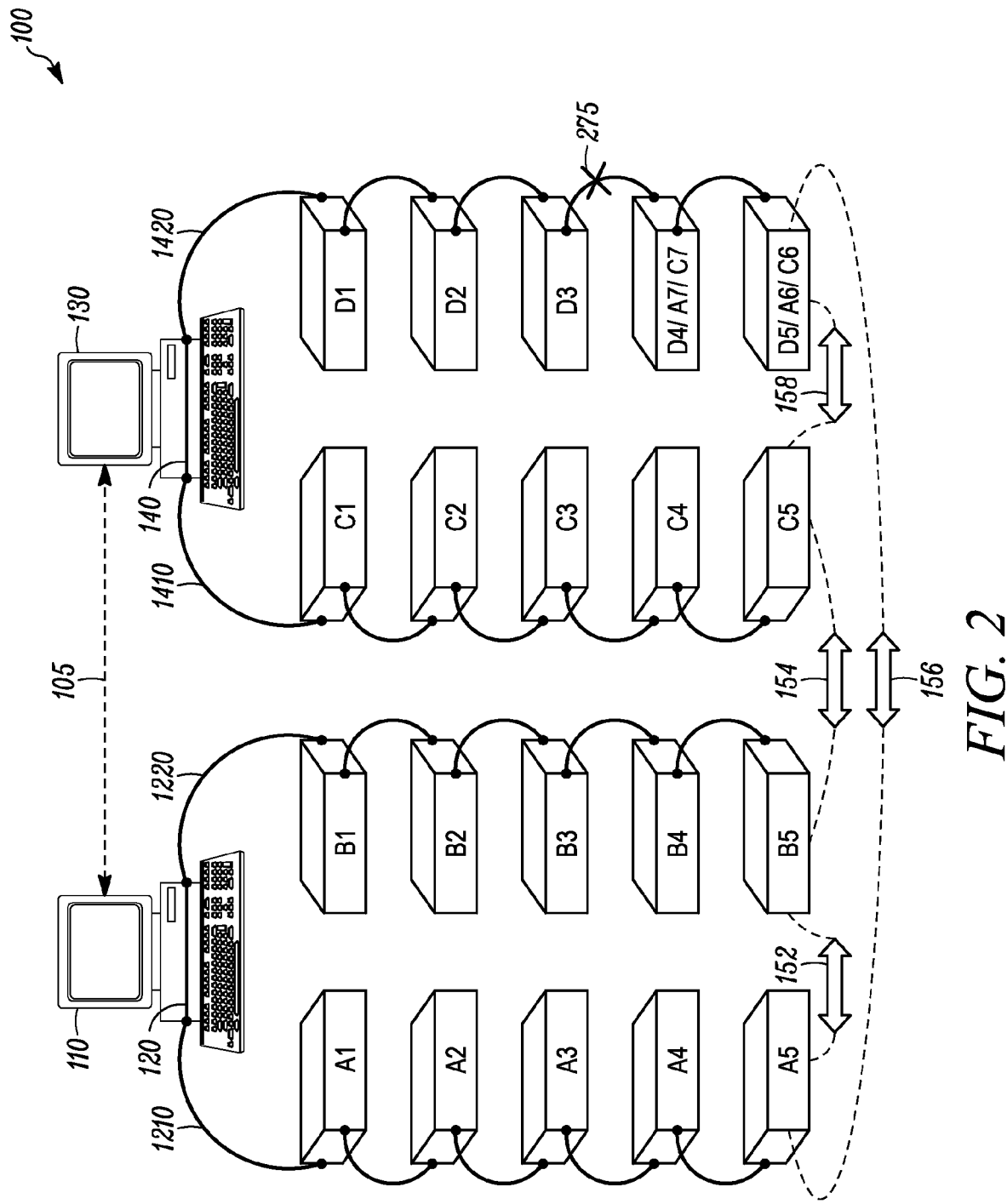
FIG. 2 is a schematic diagram illustrating multiple examples of the operation of the system of FIG. 1 when the system is experiencing a non-processor non-function.
Figure 3:
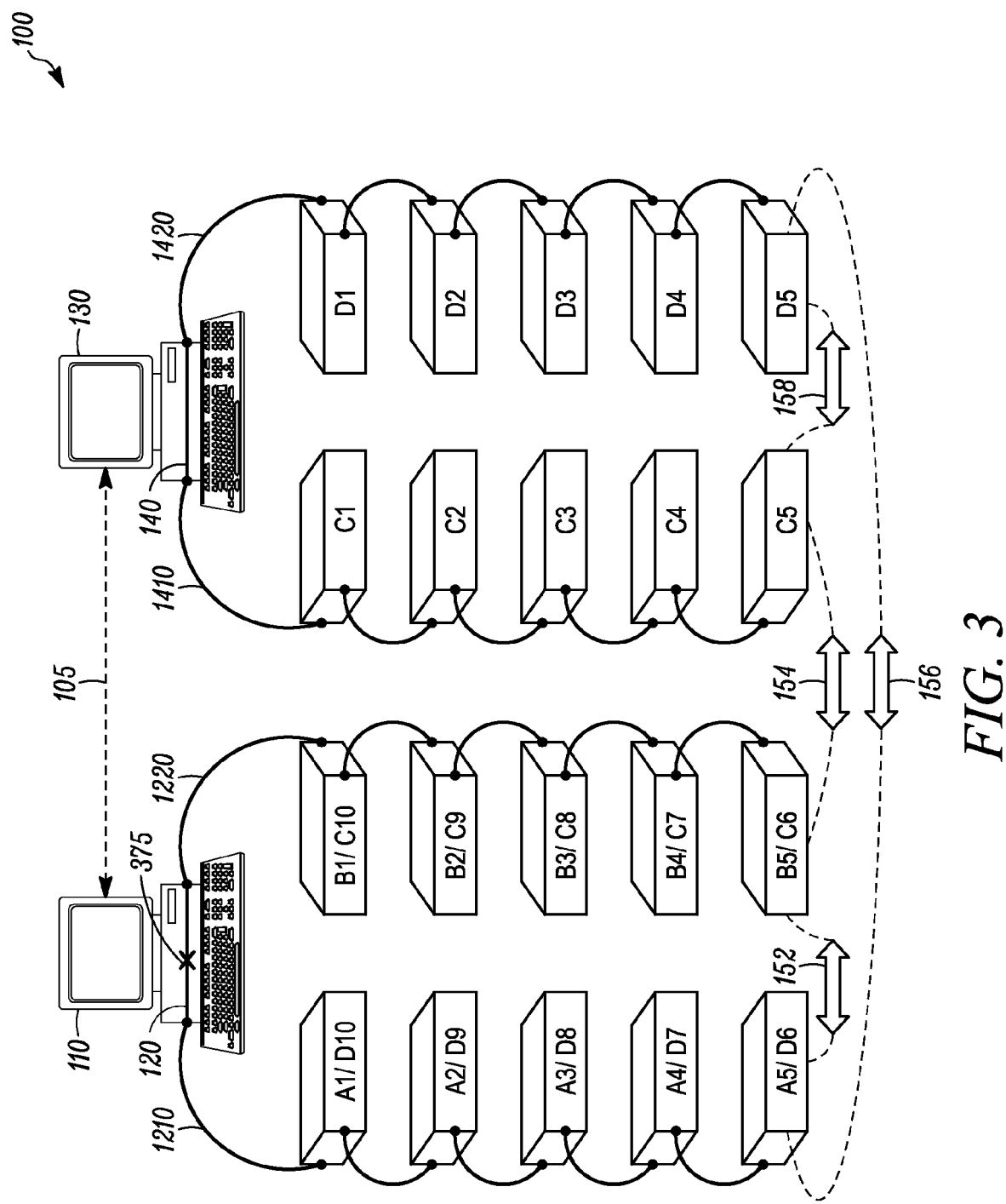
FIG. 3 is a schematic diagram illustrating an example of the operation of the system of FIG. 1 when the system is experiencing a processor non-function.

The following examples illustrated in FIGS. 2 and 3 may be helpful in understanding the operations of system 100. While the following examples may be helpful in understanding system 100, the present invention is not limited to such examples.

FIG. 2 is a schematic diagram illustrating multiple examples of the operation of system 100 when system 100 is experiencing a non-processor malfunction. In each example with reference to FIG. 2, system 100 is experiencing a malfunction 275 in the wiring on bus 1420, and specifically a wire malfunction between hardware components D3 and D4.

In a first example, TMB device 156, while monitoring buses 1210 and 1420, will recognize/detect that there is a malfunction between hardware components D3 and D4. TMB device 156 then notifies processor 120 that an malfunction has occurred, enables processor 120 to reconfigure bus 1210 to include the portion of bus 1420 including hardware components D3 and D4, and processor 120 reconfigures bus 1210 to include hardware components D4 and D5, which effectively transforms (at least temporarily) hardware component D4 into hardware component A7 and hardware component D5 into hardware component A6. Stated differently, processor 120 begins maintaining/controlling the portion of bus 1420 including hardware components A6 and A7.

Processor 120 then transmits a query to processor 140 to determine if processor 140 is malfunctioning. In this example, since processor 140 is not malfunctioning, processor 140 transmits a negative answer to the query transmitted by processor 120. Processor 120 then asks processor 140 if processor 140 would like to resume control of hardware components A6 and A7 (formerly hardware components D5 and D4, respectively). Because processor 140 is not the source of the malfunction between hardware components D3 and A7 (i.e., formerly D4), processor 140 answers affirmatively. Processor 140 then re-takes control of hardware components A6 and A7 (via TMB device 158), which effectively transforms hardware components A6 and A7 into hardware components C6 and C7, respectively.

In a second example, and with continued reference to FIG. 2, rather than TMB device notifying processor 120 of the malfunction between hardware components D3 and D4, TMB device 158 notifies processor 140 of the malfunction. More specifically, TMB device 158 transmits a query (via bus 1410) to processor 140 asking if processor 140 is able to continue maintaining/controlling hardware components D4 and D5. If processor 140 answers affirmatively (indicating a non-processor malfunction), processor 140 resumes control of hardware components D4 and D5 by reconfiguring bus 1410 to include the portion of bus 1420 including hardware components D4 and D5, which effectively transforms hardware components D4 and D5 into hardware components C7 and C6, respectively.

FIG. 3 is a schematic diagram illustrating an example of the operation of system 100 when system 100 is experiencing a processor malfunction. Specifically, this is an example of system 100 experiencing a malfunction 375 related to processor 120.

TMB devices 154 and 156, while monitoring buses 1220 and 1210, respectively, will recognize/detect the malfunction on buses 1220 and 1210. TMB devices 154 and 156 then notify processor 140 that a malfunction has occurred on buses 1220 and 1210. Processor 140 then reconfigures bus 1410 to include bus 1220, which effectively transforms hardware components B1-B5 into hardware components C10-C6, respectively. Similarly, processor 140 reconfigures bus 1420 to include bus 1210, which effectively transforms hardware components A1-A5 into hardware components D 10-D6, respectively.

Processor 140 may then transmit a query to processor 120 asking if processor 120 is malfunctioning. Since processor 120 is malfunctioning in this example, processor 140 will not receive a response from processor 120 and processor 140 will continue to control bus 1410 (which now includes bus 1210) and hardware components C1-C10, and bus 1420 (which now includes bus 1220) and hardware components D1-D10. Alternatively, processor 140 may recognize that substantially simultaneous malfunction notifications from TMB devices 154 and 156 are indicative of a malfunction in processor 120 and will not transmit a query to processor 120, but will still continue to control buses 1410 (which now includes bus 1210) and 1420 (which now includes bus 1220), and hardware components C1-C10 and D1-D10.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

We claim:

1. A computing system, comprising:
a first bus;
a second bus;
a first processor coupled to and configured to control the first bus;
a second processor coupled to and configured to control the second bus;
a first plurality of devices in communication with the first processor via the first bus;
a second plurality of devices in communication with the second processor via the second bus; and
a terminator-monitor-bridge (TMB) device coupled between the first bus and the second bus, wherein the TMB device is configured to:
selectively enable the first processor and the second processor to control at least a portion of the second bus and the first bus, respectively,
enable the first processor to control a first portion of the second plurality of devices and enable the second processor to retain control of a second portion of the second plurality of devices if a fault is detected on the second bus between the first and second portions of the second plurality of devices, and
enable the second processor to control a first portion of the first plurality of devices and enable the first processor to retain control of a second portion of the first plurality of devices if a fault is detected on the first bus between the first and second portions of the first plurality of devices.

2. The computing system of claim 1, wherein the TMB is configured to:
temporarily enable the first processor to control the first portion of the second plurality of devices if the fault is detected on the second bus; and
temporarily enable the second processor to control the first portion of the first plurality of devices if the fault is detected on the first bus.

3. The computing system of claim 2, wherein the TMB is further configured to:
temporarily disable the first processor from controlling the second portion of the first plurality of devices if the fault is detected on the first bus; and
temporarily disable the second processor from controlling the second portion of the second plurality of devices if the fault is detected on the second bus.

4. The computing system of claim 3, wherein the TMB is further configured to:

enable the first processor to re-control the first portion of the first plurality of devices if the fault on the first bus is a first non-processor fault; and enable the second processor to re-control the first portion of the second plurality of devices if the fault on the second bus is a second non-processor fault.

5. The computing system of claim 1, further comprising:
a first computing device including the first processor; and
a second computing device including the second processor.

6. The computing system of claim 1, wherein the first bus is a universal bus (USB) and the second bus is a USB.

7. The computing system of claim 1, wherein the first bus is an IEEE 1394 bus and the second bus is an IEEE 1394 bus.

8. The computing system of claim 1, wherein the first bus is an RS 422 bus and the second bus is an RS 422 bus.

9. The computing system of claim 1, wherein the first bus is an Ethernet bus and the second bus is an Ethernet bus.

10. A method for operating a terminator-monitor-bridge (TMB) device coupled between a first bus including a first plurality of devices controlled by a first processor and a second bus including a second plurality of devices controlled by a second processor, the method comprising the steps of:

monitoring the first bus and the second bus for faults;

at least temporarily enabling the first processor to control a first portion of the second plurality of devices and enabling the second processor to retain control of a second portion of the second plurality of devices if a fault is detected on the second bus between the first and second portions of the second plurality of devices; and at least temporarily enabling the second processor to control a first portion of the first plurality of device and enabling the first processor to retain control of a second portion of the first plurality of devices if a fault is detected on the first bus between the first and second portions of the first plurality of devices.

11. The method of claim 10, further comprising the steps of:

enabling, on a non-temporary basis, the first processor to control the first portion of the second plurality of devices; and enabling, on a non-temporary basis, the second processor to control the first portion of the first plurality of devices.

12. The method of claim 10, further comprising the steps of:

at least temporarily disabling the first processor from controlling the first portion of the first plurality of devices if the fault on the first bus is detected; and at least temporarily disabling the second processor from controlling the first portion of the second plurality of devices if the fault on the second bus is detected.

13. The method of claim 12, further comprising the steps of:

enabling the first processor to re-control the first portion of the first plurality of devices if the fault on the first bus is a first non-processor fault; and enabling the second processor to re-control the first portion of the second plurality of devices if the fault on the second bus is a second non-processor fault.

14. The method of claim 10, further comprising the steps of:

reporting bus status information including the fault for the second bus on the first bus; and reporting bus status information including the fault for the first bus on the second bus.

15. The method of claim 10, wherein the step of at least temporarily enabling the first processor to control the first portion of the second plurality of devices comprises the step of enabling the first processor to control the first portion of the second plurality of devices independent of input other than the fault detected on the second bus; and wherein the step of at least temporarily enabling the second processor to control the first portion of the first plurality of devices comprises the step of enabling the second processor to control the first portion of the first plurality of devices independent of input other than the fault detected on the first bus.

16. A terminator-monitor-bridge (TMB) device configured to be coupled to a first bus including a first plurality of devices controlled by a first processor and a second bus including a second plurality of devices controlled by a second processor, the TMB device comprising:

means for monitoring the first bus and the second bus for faults;

means for at least temporarily enabling the first processor to control a first portion of the second plurality of devices and enabling the second processor to retain control of a second portion of the second plurality of devices if a fault is detected on the second bus between the first and second portions of the second plurality of devices; and means for at least temporarily enabling the second processor to control a first portion of the first plurality of devices and enabling the first processor to retain control of a second portion of the first plurality of devices if a fault is detected on the first bus between the first and second portions of the first plurality of devices.

17. The TMB device of claim 16, further comprising:

means for enabling, on a non-temporary basis, the first processor to control the first portion of the second plurality of devices; and means for enabling, on a non-temporary basis, the second processor to control the first portion of the first plurality of devices.

18. The TMB device of claim 16, further comprising:

means for at least temporarily disabling the first processor from controlling the first portion of the first plurality of devices if the fault on the first bus is detected; and means for at least temporarily disabling the second processor from controlling the first portion of the second plurality of devices if the fault on the second bus is detected.

19. The TMB device of claim 18, further comprising:

means for enabling the first processor to re-control the first portion of the first plurality of devices if the fault on the first bus is a first non-processor fault; and means for enabling the second processor to re-control the first portion of the second plurality of devices if the fault on the second bus is a second non-processor fault.

* * * * *